Figure 1:
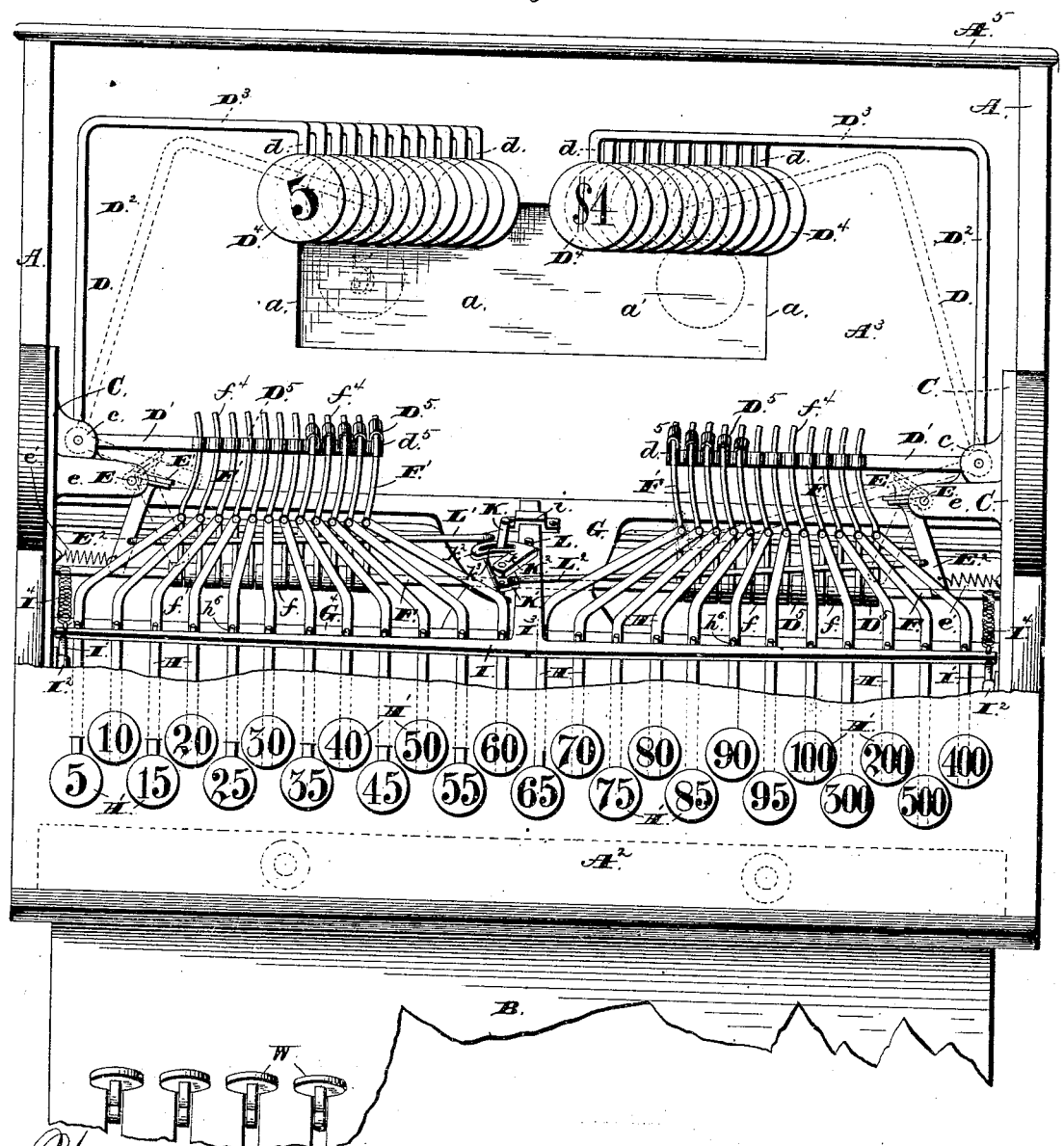

(No Model.)

C. B. HOPKINS.
CASH REGISTER AND INDICATOR.

No. 321,815. Patented July 7, 1885.

Witnesses:
Jas. E. Hutchinson.
Henry C. Hazard.

Inventor.
C. B. Hopkins
by Prindle & Russell
Attorneys.

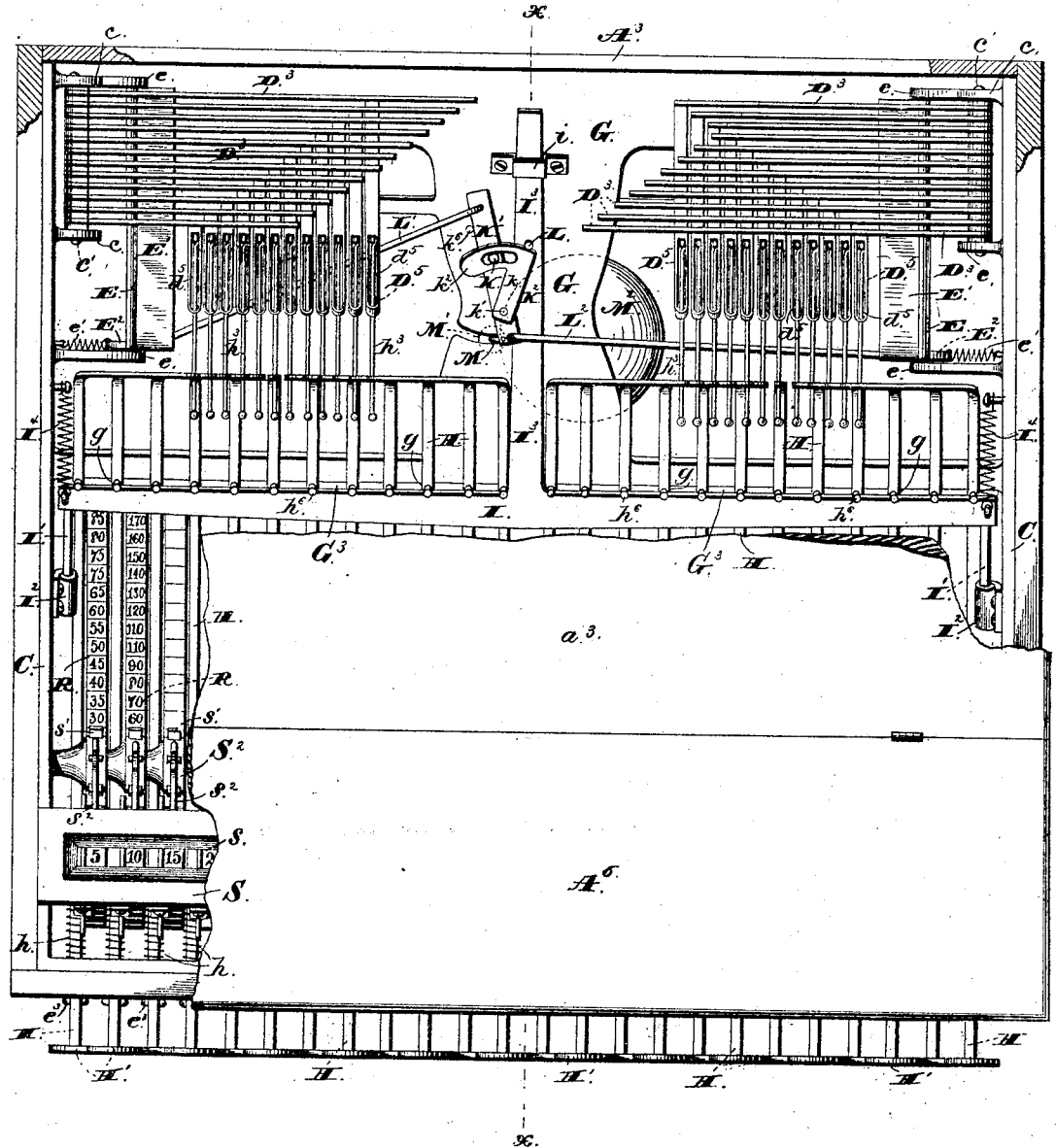

(No Model.) 4 Sheets—Sheet 3.
C. B. HOPKINS.
CASH REGISTER AND INDICATOR.
No. 321,815. Patented July 7, 1885.
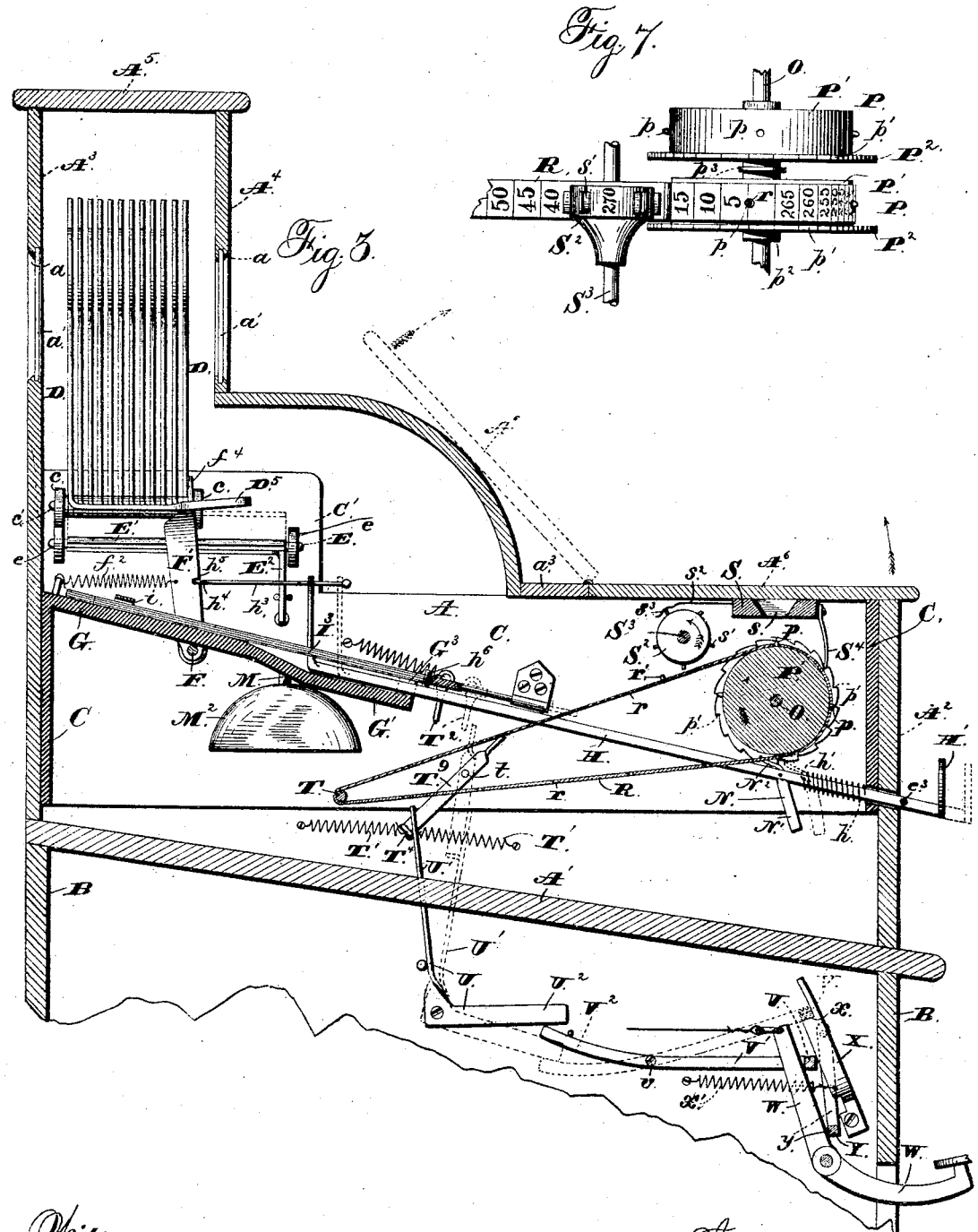

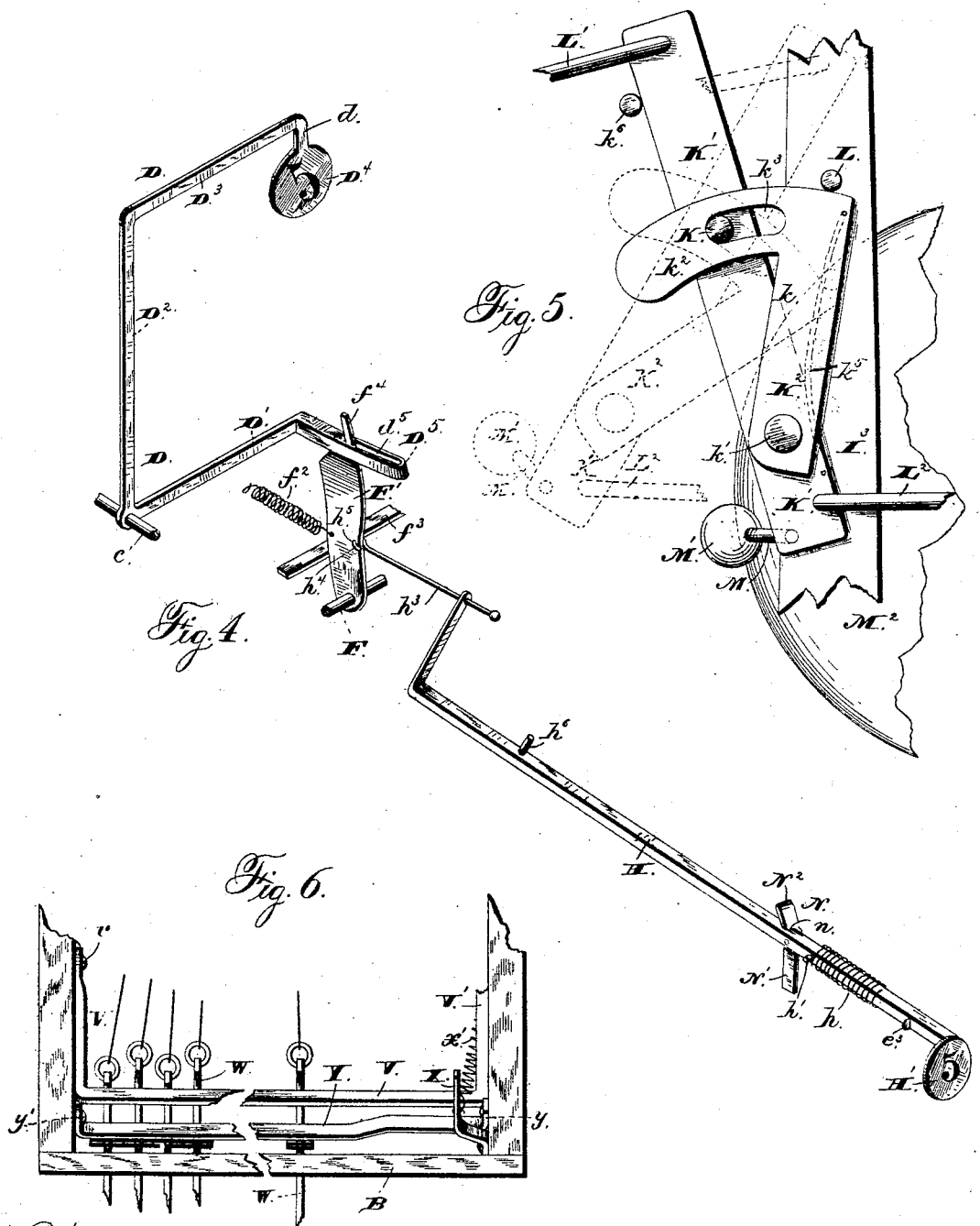

UNITED STATES PATENT OFFICE.

CABEL B. HOPKINS, OF PAYNE'S DEPOT, KENTUCKY.

CASH REGISTER AND INDICATOR.

SPECIFICATION forming part of Letters Patent No. 321,815, dated July 7, 1885.

Application filed September 6, 1884. (No model.)

*To all whom it may concern:*

Be it known that I, CABEL B. HOPKINS, of Payne's Depot, in the county of Scott, and in the State of Kentucky, have invented certain new and useful Improvements in Cash Registers and Indicators; and I do hereby declare that the following is a full, clear, and exact description thereof, reference being had to the accompanying drawings, in which—

Figure 1 shows a view in front elevation of my invention, a portion of the casing and the registering wheels and bands being removed to show the parts more clearly; Fig. 2, a plan view of the indicator and register with a portion of the top casing removed; Fig. 3, a vertical sectional view on line $x$ $x$ of Fig. 2 of the register and indicator and a portion of the connected money-changer below; Fig. 4, a detail perspective view showing the mechanism for operating one of the drops; Fig. 5, an enlarged detail plan view of the mechanism for actuating the drop-raising devices and ringing the alarm-bell; Fig. 6, a detail plan view showing the mechanism for locking the levers of the coin-counter or money-changer, and Fig. 7 a similar view of a portion of one of the register-belts with the register-wheel operated thereby.

Letters of like name and kind refer to like parts in each of the figures.

The object of my invention is to provide an improvement in cash registers and indicators adapted for use in connection with the coin-counter patented by me November 20, 1883, No. 288,942, but capable of being used without and separate from such counter, as desired; and to this end my invention consists in the construction, arrangement, and combination of parts, as hereinafter specified.

In the drawings, A designates the casing of the register and indicator, and B that of the coin-counter or change-maker. As shown, the bottom A' of the former casing forms the top of the other and is hinged to it at the back. Where the register and indicator is to be used apart from the counter or changer this bottom will of course be made horizontal or inclined to suit the surface upon which it is to rest. Where, as in the drawings, it forms the top of the counter-casing I contemplate locking it down securely in place by means of any desired form of box-lock.

The casing A has the vertical front $A^2$ and the elevated vertical back piece, $A^3$. In this back, near its top, is the oblong opening $a$, closed with glass $a'$, through which can be seen the numbered indicator-disks when they are dropped down into position, as hereinafter described. A transverse vertical board, $A^4$, parallel to the back board, $A^3$, and provided with a similar glass-closed opening, covers the front of the space occupied by the series of disks and their arms. The top board, $A^5$, covers over this space. From the lower edge of board $A^4$ the top of the casing is preferably rounded or curved downward to the plane of the upper edge of board $A^2$. A narrow transverse board, $a^2$, forms the rigid portion of the cover, extending forward from the lower edge of the curved portion described above. To the forward edge of board $a^2$ is hinged the cover $A^6$, which can be raised to display the registering mechanism within the front part of the box. This lid is of course to be provided with a suitable lock, so that the mechanism cannot be tampered with. The sides of the box or casing are closed by suitably-shaped vertical boards.

A metal frame, C, fitting within the casing and held thereby screws, serves to support all the operative parts of the apparatus. A portion, C', of this frame extends up at each side within the raised part at the back of the box. In lugs $c$ $c$, extending inward from each of these portions C', are fixed the ends of the horizontal pivot bars or rods $c'$. Upon each of these rods is pivoted a series of drop-levers, D D, of which I show twelve on each pivot-rod. This number, however, can of course be increased or diminished, as desired. Each of these levers consists of the horizontal arm D', the vertical arm $D^2$, and the upper horizontal arm, $D^3$, extending inward from the end of the vertical arm and carrying on its inner end a disk, $D^4$. Each disk is below the arm end, and is preferably connected therewith by a short downward extension, $d$, of the arm. The corresponding arms of the different levers of each series are in the same planes, the vertical arms being of equal lengths. The upper horizontal arms, $D^3$, of each series are preferably made of different lengths, so that the disks carried on the ends thereof, while overlapping, will not be in line. In the series of levers at the left of the apparatus the front lever is made the shortest and the next a little longer, and so on. This arrangement of the levers with respect to the lengths of their upper arms is reversed in the series of levers on the right, the longest being in front; but this arrangement can be varied as desired without departing from my invention. The levers are pivoted upon the pivot-bars at the angles between their vertical and lower horizontal arms. These latter arms are, as shown, made of different lengths, the front one being the shortest, and each succeeding one in the rear being made a little longer than the one in front, so that the slotted arms D⁵, extending forward from the ends of the respective arms D' D' while standing alongside of each other, will not interfere as the lever-arms D D are moved up and down separately. The forwardly-extending slotted arms D⁵ D⁵ toward the inner ends of the series are bent slightly upward, as shown in Figs. 1 and 3, for the purpose to be hereinafter described.

Below the series of horizontal lever-arms D' D' at each side is a horizontal bar or rod, E, which at its forward and rear ends is journaled in lugs e e, extending inward from the metal frame. Attached at one edge to this rod is the plate E', forming a swinging wing. Attached to and extending from the outer or under side of this wing is the arm E², which is normally pulled outward by the spiral spring e', so that the wing will be held with its face horizontal and its free edge inward, as shown in Fig. 1. This wing has such a radius and is so situated below the series of lever-arms that when it is swung upward, as shown in dotted lines in Fig. 1, it will raise with its edge any lever arm or arms D which may have dropped below the others up into a horizontal position again with the rest. Pivoted upon a rod, F, which extends across the interior of the frame from side to side below the two series of arms D⁵ D⁵ are the two corresponding series of upright swinging stops F' F', provided with steadying-hubs f f. There is one of these stops for each looped arm D⁵. The upper end of each stop is cut away on the rear side to form a shoulder, upon which, when the stop is in the upright position, as shown in Fig. 4, the solid portion of the respective arm D⁵, at the rear end of the slot d⁵, will rest so that the arm D' of the drop-lever D will be supported in a horizontal position, and the upper disk or drop-carrying arm D³ will be kept raised. Springs f² f²—one for each stop—tend to keep the stops upright in position to engage the arms D⁵, as described. A light rigid bar, f³, behind each series of stops serves to limit the backward swing of the stops under the influence of the springs. The narrow tongue f⁴ of each stop, at its upper end, by projecting up into the slot or loop d⁵ of its respective arm D⁵, prevents the arm or stop from being sprung or bent out of proper position with relation to each other. Each stop is formed of a plate or flat piece of metal, as shown, bent with a curvature corresponding with that of the arc of travel of its respective lever-arm D⁵ as the latter is allowed to drop down, as indicated in dotted lines in Fig. 1.

The metal frame C within the box is formed with the middle supporting-plate portion, G, extending forward from the central portion of its back and inclined downward at a slight angle. As best shown in Fig. 3, this plate is, near its forward end, bent down and then extended forward again to form the portion G', whose upper surface is in a plane parallel to that of the main portion G. At its extreme forward end the plate is turned upward to form an upright flange or rib, G³, which is continued on each side of the plate along the bar G⁴, forming a portion of the frame and extending from the plate G to the sides of the frame. Supported on this bar and guided in notches g g in the upright rib are the rear portions of rods H H, of which there is one for each of the stops F' for the drop-levers. The rear ends of the rods at the middle of the series slide and are supported upon the depressed lower end, G', of plate G. The forward ends of the rods pass through and are guided in their longitudinal reciprocations by suitable openings in the front portion of frame C. On their outer ends, where they project through the casing, they are provided with disks or flat handles H' H', marked to correspond with the amount marked on the front and back side of the drop-disks on the respective levers to be operated by the rods, as will be described. The disk-like handles or thumb-pieces are attached to the rod ends at their upper and lower edges alternately, so that the disks can be made of considerable size and not interfere with each other. The rear portion of each rod is bent over or inclined, as shown, to bring its end in line with that one of the series of lever-stops F' F' which it is to actuate. A spring, h, surrounding each rod and bearing at one end against a pin, h', in the rod, and at the other against the frame C, serves to throw the rod automatically inward into its normal position when it has been pulled out and released. A stop pin or lug, e³, on each rod H limits the inward throw of the said rods H H. Through an eye in the inner and rear end of each rod passes loosely a headed wire or small rod, h³, which at its rear end is connected with one of the stops F', preferably as shown in the drawings in Fig. 4, by a loop, h⁴, in the end of the connecting-rod and a hole, h⁵, in the stop-plate. This connecting-wire is of such length that when rod H is pulled out its end will not come in contact with the head on the wire until said rod has nearly reached the limit of its movement. Continued outward movement of the rod will then draw the connecting-wire and the stop forward, so that the slotted or looped arm D⁵ of the drop-lever will be released and allowed to fall down, as indicated in Fig. 3. This allows the respective drop-lever to fall down and expose its marked disk, so that the amount marked thereon can be seen through the glass-closed openings $a'\ a'$ in the upright portion of the case.

The handle-disks on the outer ends of the rods are marked, as shown, with numbers to indicate various sums from five cents up to one hundred or one dollar, and several of them at the right are marked two, three, four, and five hundred, respectively, to indicate dollars. The sums indicated on the disk-handles can of course be graduated, as desired.

Each drop-disk is marked to correspond with the marking on the handle $H'$ of its respective operating-rod $H$, so that it can always be ascertained from the disk or disks displayed through the case-openings which rod has been pulled out.

After one or more of the levers have been allowed to drop down by pulling one rod or several at a time it is necessary that they should be thrown up into position again with their drop-disks hidden, and their arms $D^5$ engaged by the supporting-stops before another sum is indicated and registered by the movement of another rod.

I have provided means whereby upon the pulling out of any one of the rods all the levers that may be down will be raised up into position to be engaged and held up by their stops before the stop for the lever corresponding to the rod pulled is drawn forward to release said lever and leave it free to drop.

As described hereinbefore, a lever-stop is not actuated by the movement of its respective rod until such rod has nearly reached the limit of its outward movement. It is during the first part of its movement that the lever raising and setting devices are actuated.

Each rod $H$ is, as shown in the drawings, provided with a pin, $h^6$, situated just forward of the rib $G^3$ in the notches $g$ in which the rods are guided, as described above. These pins engage the rear side of the bar $I$, extending across from side to side of the casing just above the rods $H\ H$. At its ends this bar is provided with guide-rods $I'\ I'$, projecting forward in a plane substantially parallel with that of rods $H\ H$ and plate $G$, and fitting and sliding in guide-sleeves $I^2\ I^2$, attached to the inner sides of the frame. An arm, $I^3$, extending rearward from bar $I$ rests and slides upon the upper rear part of plate $G$, and at its rear end is guided in loop $i$ on the top of said plate.

Springs $I^4\ I^4$—one at each side—attached to an end of bar $I$ and the casing serve to keep the bar drawn back, as shown in Figs. 1 and 2, in contact with the pins on rods $H\ H$, so that if one of the rods be drawn outward its pin will cause the bar $I$ and arm $I^3$ to move with it.

On the plate $G$, beside the arm $I^3$, is a pin, $K$, which is perpendicular to the plate. Upon this pin and at such a height that its ends can swing over the arm $I^3$, as shown in Fig. 5, is pivoted the bar $K'$. Pivoted on top of this bar at a point near its forward end is the pawl $K^2$, consisting of the straight arm $k$, pivoted at its forward end on the pin $k'$, and the curved arm $k^2$, extending over the bar $K'$ from the other end of part $K$. This arm $k^2$ is, as shown, curved on an arc with the pin $k'$ as a center, and is provided with the short correspondingly-curved slot $k^3$, engaging the pivot-pin $K$ of the bar $K'$. The pawl thus formed and limited in its swing by the slot and pin is normally held swung out with its angle projecting over the sliding arm $I^3$ by the spring $k^5$, (shown in Fig. 5,) attached to the swinging bar at one end and at the other to the pawl. To limit the outward throw of the rear end of the bar $K'$, a stop-pin, $k^6$, is suitably placed on the plate $G$.

On the sliding arm $I^3$, extending, as described, rearward from the bar $I$, is the pin $L$, which is so situated that when the bar $I$ and arm $I^3$ have been carried rearward by the springs $I^4\ I^4$ to the limit of their movement the pin will be just in the rear of the pawl, as shown best in Fig. 5. If, now, the arm $I^3$ be slid outward and forward the pin $L$ will engage the pawl, and pressing upon it at its angle, will, as said pawl cannot swing out any farther with reference to bar $K'$, cause the bar to swing into the position shown in dotted lines in Fig. 5. As soon as the pin passes off the pawl the bar $K'$ is released and flies back quickly to its original position. This quick return swing is caused by the springs $e'\ e'$, already described, pulling outward on the arms $E^2\ E^2$ depending from the lever-elevating wings $E'\ E'$. Connecting these arms with the opposite ends of the pivoted bar $K'$ are the connecting-rods $L'\ L^2$, the former connecting the wing-operating arm $E^2$ on the left side of the case with the rear or upper end of the bar.

The pin $L$ is so situated that it passes off the engaging portion of the pawl and allows the bar $K'$ to be swung back again, as described above, before the limit of the outward movement of the arm is reached.

As the bar is swung, as described above, by the engagement of the pin on sliding arm $I^3$ with its pawl, the lever-elevating wings $E'\ E'$ will be swung up to raise the lower horizontal arm or arms, $D'$, of any drop lever or levers that may be down up into position to be engaged and held by the respective stop or stops.

As the pawl on the bar $K'$ is released by pin $L$ the wings are swung or dropped down quickly by their springs, so as to allow any of the levers which may be unengaged by their stops to drop down to display their marked drop-disks.

As one of the rods $H\ H$ is pulled out to register and indicate a certain amount, and moves the bar $I$ and arm $I^3$, as described above, it pulls forward its respective lever-stop by the connections described before the lifting wings are dropped down. The lever then rests upon the upturned edge of one of the wings, and when said wing is dropped, as above set forth, drops down to display its marked disk. The action is the same when any desired number of sliding rods are pulled out at the same time. The corresponding stops are pulled forward to allow the several levers to be supported by the lifting wing or wings, and to drop when such wing or wings fall. When the sliding rod is released, its spring $h$ throws it back, and the bar with its sliding arm $I^3$ is carried back by its springs, as described.

As the arm $I^3$ slides back its pin L bears against the side of the pawl on bar K', and forcing it aside against the stress of its spring $k^3$, passes up along it and beyond its end, when the pawl is thrown out over the arm $I^3$ again in the way of the pin in its next forward movement.

To the forward arm of the pivoted bar K' is fastened the pendent arm M, which, as shown in Fig. 2, projects down through a slot in the frame-plate G, and bears on its lower end a knob or striker, M', adapted to strike the alarm-bell $M^2$, fastened to the under side of the frame-plate as the bar is swung back into its normal position, (shown in Fig. 2,) when the pawl on the bar is released and the wings fall. The bell will then be struck every time any of the bars may be drawn out to register any amount or amounts. As the stroke on the bell takes place just as the indicating drop lever or levers are dropping down, by a glance at the disk or disks displayed at that time it can be seen at once whether the right rod or rods have been pulled out.

I prefer to have the registering mechanism operated during the return movement of the rods H H under the stress of their return springs. I therefore pivot on the side of each rod H, preferably near its forward end, as shown best in Fig. 4, a swinging pawl, N, consisting of the pendent arm N' and the upper engaging portion, $N^2$, normally projecting up above the top of the rod, with a slight rearward inclination, while the arm N' hangs freely downward. A shoulder, $n$, on the pawl $N^2$, striking the upper face of the rod, holds the pawl rigid against pressure on the rear side of its upper end, while allowing it to yield and swing down upon the rod under pressure upon its forward side.

Above the series of rods H H, and over the pawls N thereon, is the stationary shaft or rod O, extending from side to side of the frame, and supported at its ends in the frame sides. Upon this rod are journaled the register-wheels P, one over each bar or rod H. These wheels are all alike, and each one consists of the main pulley-shaped portion P', on the peripheral face of which are several pins or studs, $p\ p$, placed at equal distances from each other, and the ratchet-toothed portion $P^2$ at one side of such main portion P', and with its teeth $p'\ p'$ projecting beyond the periphery thereof. These two portions, forming the wheels P, can be made separate or in one piece, as desired. The wheels are kept in position and at proper distances from each other on the rod O, upon which they are journaled by means of hubs $p^2\ p^2$ and washers $p^3\ p^3$. Over the main portion P' of each of these wheels passes a band, R, provided with openings or holes $r$, adapted to be engaged by the pins or studs $p\ p$ as the wheel turns to move the band. Each band is numbered or marked consecutively with numbers indicating amounts made up of one, two, three, &c., times the amount marked on the disk-handle of the respective rod H below the band-wheel. The marked divisions of each band are made of such length that the band will be moved through a distance equal to one of them each time the respective wheel P is turned through the distance of one tooth. The pawls N N engage the ratchet-teeth $p'\ p'$ as the rods are released and fly back after having been pulled out.

When a rod is being drawn out, the pawl is swung down to pass under a ratchet-tooth on the wheel, but after passing out from under such tooth is swung up by the action of its weighted arm to engage the next tooth, when the rod is released and the spring drives it back.

For each successive time that a rod, H, is pulled out its register-wheel will then be turned through a distance sufficient to bring the next higher-numbered division on its belt or band R up into position to be read through the slot $s$, in the transverse bar S, extending across the interior of the box over the centers of the wheels P P. The bands, as shown, pass around these wheels and also around a smooth cylindrical rod, T, extending across the casing near its rear side. If desired, a series of small pulleys, one for each band, could be journaled on this rod.

To indicate how many times an entire band with its graduations has passed under the reading-slot $s$, I place a lug, $r'$, so situated on the belt that as the highest number or amount marked on said belt passes out from under slot $s$ the lug will come in contact with and move one tooth or lug $s'$ on a wheel, $S^2$, above the belt and to the rear of bar S.

Each wheel $S^2$, as shown, has its peripheral surface divided into divisions marked consecutively with numbers, indicating once, twice, &c., the largest amount indicated on the corresponding belt below. The lug $r'$ on the belt as it moves along under wheel $S^2$ comes in contact with one of its teeth, $s'$, and turns such wheel to bring the next succeeding marked division thereon on top.

There is one wheel, $S^2$, for each belt, and the series of wheels is journaled upon the rod $S^3$ extending across over the series of belts, the wheels being kept in place thereon by suitable distance pieces or washers.

To prevent the wheels $S^2\ S^2$ from being accidentally turned, a spring rod or plate, $s^2$, extending rearward from the slotted bar S over the wheels is formed near its outer end with a short upward bend, $s^3$, to receive and hold the end of one of the teeth upon which the spring presses. As the wheel is revolved the tooth presses against the inclined sides of this bend, raises the spring, and passes on, and the next tooth is engaged by the spring. A series of spring-pawls, $S^4$, attached to and extending down from the bar S engage the ratchet-teeth on the wheels P P to prevent backward motion of the same.

Any number of bracket-arms can obviously be used to support the rod upon which the wheels P P are journaled elsewhere than at its ends.

The arms $D^5$ $D^5$, extending forward from the lower horizontal lever-arms, D' D', may be made, as described, with slots formed in them for the ends of the lever-supporting stops; or they can be formed of thinner metal bent to form loops to surround the upper ends of the stops.

Where my register and indicator, as described above, is to be used with my coin-counter or money-changer as I contemplate using it, I find it desirable to have some means for automatically locking the operative levers of the counter or changer until the amount received is indicated and registered, and then unlocking them.

I therefore have provided the locking mechanism as follows: On a pivot pin or lug, $t$, on the supporting metal frame C is pivoted the lever $T^9$, held by means of springs T' T' pulling in opposite directions upon its lower end, with its upper end in the path of a lug or arm, $T^2$, projecting down from the end of bar I. As the bar I is slid or pulled outward and forward, as described hereinbefore, by the engagement of the pin on one of the register-rods H, the lug $T^2$ rides over the upper end of lever $T^9$. When the lug releases the end of the lever $T^9$, it is, by the action of the springs described, returned into position to be again engaged by the lug as the bar I returns to its normal position of rest. The extreme lower end of lever $T^9$ is, as shown in Fig. 3, bent at a right angle to form the inwardly-projecting arm $T^4$. Pivoted to the inner side of the coin-counter casing below is the right-angled lever U, whose upper end, U', projects up through a slot or opening in the bottom of the register and indicator casing into position to be engaged by arm $T^4$ of lever $T^9$ as such arm is swung forward by the lug $T^2$ on the bar I, engaging and pushing rearward the upper end of said lever $T^9$.

A rod or bar, V, at the front of the counter-casing, is at its ends bent rearward, and the rearwardly-extending portions or arms V' V' of it are pivoted to the sides of the casing at $v$, so that the bar can be swung down in front of the upright arms of the series of levers W W for operating the slides of the money-changer, and up above and clear of their upper ends. While down, as shown in full lines in Figs. 3 and 6, the bar V locks all the levers W W, so that they cannot be moved to cause change to be delivered from the money-changer. One of the pivotal arms or portions V' V' of the rod is extended rearward beyond its pivot to form a lever-arm, $V^2$, over the end of which projects the end of the horizontal arm $U^2$ of the lever U. As the lever U is moved by the mechanism already described to throw forward its upright arm and lower its horizontal one, the lever-arm $V^2$ is forced downward by the engagement with it of the horizontal arm of lever U, the bar V is raised clear of the upper ends of the slide-operating levers W W of the money-changer, and is caught and held in such elevated position, as shown in dotted lines in Fig. 3, by the shoulder $x$ on swinging stop X, pivoted to the side of the casing at a point forward of and below the bar V. A spring, $x'$, tends to keep this stop normally in position to automatically engage the bar V, as described, as soon as the bar is raised. This stop X is bent inward away from the casing side, as shown, and then substantially parallel with it, to allow room for the upright arm $y$ of the swinging bar Y to extend up between it and the casing. Such upright arm of bar Y is pivoted at its upper end to the casing, as shown in Fig. 3. At its other end the bar Y is supported by another upright arm swung from pivot $y'$. The bar thus supported extends and rests against the forward sides of the upright arms of the slide-operating levers W W.

With this construction, with the lever-stop bar or rod V raised and held up by its pawl, as shown in dotted lines in Fig. 3, the slide-operating levers W W of the changer are free to be moved, as desired, to make change. Whenever, however, one of them is moved by pressing one of the keys on the outside of the casing, the lever will strike the bar Y and swing it toward the front of the case. The pivotal or supporting arm $y$ of this bar will then strike the pawl or stop X and cause it to release the lock-bar V, which then drops down and locks the levers. If, now, one of the rods H H be pulled out to register and indicate an amount of money received, and allowed to fly back, the lug $T^2$ operates, as described, the lever $T^9$ to cause the lever U to move so as to swing the locking-bar V up again in position to be caught by swinging stop X and held up clear of the levers. Change can then be taken from the changer, which after such operation is immediately locked again by the bar, as described fully hereinbefore.

Where the register and indicator is to be used separately, the lug on the bar I and the pivoted lever $T^9$ operated by it are to be dispensed with, and the bottom of the casing will then be made horizontal, or of any desired shape and angle to fit the surface upon which it is to rest.

If desired, I contemplate also putting a drawer in the register and indicator casing, as indicated in dotted lines in Fig. 1.

As indicated hereinbefore, a few of the looped or forwardly-extending arms $D^5$ $D^5$ of the drop-levers near the inner ends of the series are bent slightly upward. This is to compensate for the increased downward throw of the long horizontal lever-arms of such levers.

Obviously each of the arms extending forward from one of the horizontal arms of the drop-levers can be made in one piece with the lever-arm, or be made separate and attached thereto, and can be made of a loop of metal or of a slotted piece.

Having thus described my invention, what I claim is—

1. In combination with a series of pivoted levers carrying suitably-marked drop-disks, means for supporting the levers with the disks raised, and means for allowing one or more of the levers to drop, as desired, substantially as shown and described.

2. The series of pivoted drop-levers carrying suitably-marked indicating-disks, in combination with means, substantially as described, for holding the levers in elevated position, means for causing one or more of the levers to be released and allowed to drop down, and means for raising them again, substantially as shown and described.

3. In an indicator, a pivoted lever carrying a suitably-marked indicating-disk, a pawl or stop adapted to engage the lever and hold it with its disk elevated above the display-opening in the casing, means for causing the pawl or stop to release the lever and allow it to drop down, and means for raising it again into position to be engaged by the pawl, substantially as and for the purpose described.

4. In combination with the series of levers carrying the indicating-disks, the series of pawls or swinging stops engaging the levers and adapted to support them with their disks above the display-opening in the casing, means for causing the pawls or stops to release and allow to drop down one or more of the levers, as desired, and means for raising together into position to be engaged by the pawls or stops all the levers that have been dropped, substantially as and for the purpose described.

5. In combination, with a pivoted drop-lever and the indicator-disk carried thereby, a pawl or stop engaging and supporting such lever, means for causing the pawl or stop to release the lever and let it drop, means for raising it again to be engaged by the pawl, a single sliding rod, and connecting means, substantially as described, whereby the pawl and the lever-raising mechanism are operated by the rod, substantially as and for the purpose described.

6. The series of pivoted drop-levers having the upright portions, the upper horizontal arms carrying the indicating-plates, and the lower horizontal arms of different lengths provided with slotted arms extending substantially at right angles to the ends of such lower horizontal arms, in combination with the series of swinging stop or pawl plates projecting at their upper ends up through the slots in the arms attached to the levers and provided near their upper ends with stop-shoulders to engage such arms, and means, substantially as set forth, for causing one or more of the pawls to release the levers as desired, substantially as and for the purpose described.

7. In an indicator, the series of drop-levers carrying indicating-disks, the pivot-bar on which the levers are pivoted, and the series of swinging stops adapted to engage portions of the drop-levers so as to hold such levers elevated, in combination with the elevating-wing pivoted below the levers, and means, substantially as described, adapted to cause one or more of the stops to release their respective drop-levers, and means, substantially as described, adapted to swing the wing up to raise the levers again, substantially as specified.

8. In combination with the series of pivoted drop-levers carrying the indicating plates or disks, and provided with horizontal arms, the series of swing-pawls or stop-plates adapted to support such arms in raised position, the elevating-wing pivoted below and extending under such arms, means for moving any desired pawl to release its respective lever, and means for swinging the wing up with its edge against the horizontal arms of the levers before the pawl is moved, keeping it so until after the pawl has been caused to release its lever, and then swinging it suddenly down again, substantially as and for the purpose described.

9. The series of drop-levers having the upright arms, the upper horizontal arms of different lengths carrying indicator disks or plates and the lower horizontal arms also of different lengths, in combination with the pivot-rod, upon which each lever is pivoted at the angle between its upright portion and lower horizontal arm, the series of slotted arms extending forward from the ends of the lower lever-arms, the series of pawls engaging such slotted arms, the elevating-wing pivoted below and extending under the lower lever-arms, means for causing any desired number of pawls to release the slotted arms, and means for swinging up the elevating-wing before the pawls are actuated and keeping it swung up until after said pawls have released their levers, all substantially as and for the purpose described.

10. In combination with the swinging pawl or stops for holding up a drop-lever, the sliding rod having its end turned up, the wire or rigid rod attached to the pawl or stop passing through a hole in the upturned end of the sliding rod and provided on its end with an enlargement or head, substantially as and for the purpose described.

11. As a means for connecting each pawl operating rod with its pawl so as to allow some outward movement of the rod before the pawl is moved, the rod attached at one end to the pawl and at the other passing loosely through a hole in the upturned end of the pawl-operating rod, and provided with an enlargement or head at a distance beyond the rod end, all in combination, substantially as shown and described.

12. In combination with the series of pawl-actuating sliding rods provided with pins, the sliding bar extending across the series of pawl-rods in front of the pins thereon, means for retracting the bar when it has been pulled out and forward by the pulling out of one or more of the pawl-rods, and means actuated from such bar to raise such levers as have been dropped down, substantially as shown and described.

13. In combination with the series of lever-supporting pawls, the reciprocating rods connected with and adapted to actuate the pawls as they are reciprocated, the sliding bar extending across the series of rods, means for retracting such bar, means, substantially as described, for causing the bar to be drawn outward by the pulling out of one or more of the rods, the arm extending rearward from the bar, the lever-raising wings on each side, and connecting mechanism between the arm and wings, whereby as the bar is pulled forward and outward by the movement of one of the pawl-actuating rods the wings will be swung up before the pawl is moved by the rod and held up until such pawl has been moved by the rod.

14. In combination with the pawl, the reciprocating rod, and connecting means between the pawl and rod, whereby the pawl is moved only after the rod has moved through a portion of its movement, the pin on the rod engaging the rear side of the sliding bar, an arm extending rearward from the bar provided with a pin, a pivoted lever beside such arm carrying a pawl adapted to be engaged by the pin on the arm to swing the lever on its pivot until the sliding rod has caused its pawl to release the respective drop-lever, connecting-rods between the swinging-lever ends and the drop-lever, raising wings, and springs for swinging the wings down as soon as the pin on the arm passes off the pawl on the swinging lever, substantially as shown and described.

15. In combination with the two series of drop-levers, the two elevating-wings swung below the two series of levers, springs tending to keep the wings swung down, means for swinging up the wings, consisting of rods connecting an arm on each wing with one end of a pivoted bar, a pawl on such bar, and a sliding arm provided with a pin adapted to engage the pawl and swing the pivoted bar on its pivot as the arm is slid outward and forward until its pin passes off the pawl, substantially as and for the purpose set forth.

16. In combination with the lever-raising wings, the pivoted bar, the rods connecting its opposite ends with the wings, the pawl on the bar, consisting of the straight arm pivoted at its forward end upon the pivoted bar, and the curved arm extending from the end of the straight arm over the bar and provided with a slot engaging the pivot-pin of the bar, a spring tending to keep the pawl swung out beyond the side of the bar, and a sliding arm or piece provided with a pin adapted to engage the pawl as the arm slides forward and outward, substantially as and for the purpose described.

17. In combination with the lever-raising wings, the pivoted bar provided with a striker, suitable connecting mechanism between the bar and wings whereby the wings are swung up by the movement of the bar and said bar is swung back by the fall of the wings, and a bell adapted to be struck by the striker on the bar as said bar is swung by the fall of the wings, substantially as specified.

18. The series of drop-levers and the lever-elevating wings hung below the series of levers, in combination with a spring for swinging it downward, a pivoted bar, a connecting-rod between such bar and the wing, means, substantially as described, for causing any desired drop-lever to drop down, and connecting mechanism between such means and the pivot-bar adapted to cause the bar to swing so as to raise the wing and hold it raised until the lever has dropped upon and is supported by its upturned edge, and then to allow the wing and lever to fall, an alarm-bell, and a striker on the bar adapted to strike the bell as the bar is swung by the falling of the wing, substantially as and for the purpose described.

19. In a cash register and indicator, in combination with the indicating mechanism and a registering device, a sliding rod adapted to actuate the indicating mechanism as the rod is pulled out, means, substantially as described, whereby the rod is caused to actuate the registering device as the rod is returned, and a spring for returning the rod, substantially as and for the purpose described.

20. In a cash register and indicator, the series of sliding rods, the series of indicators, means, substantially as described, whereby the rods actuate their respective indicators as they are pulled out, the series of registering devices, means carried by each rod whereby it actuates its respective registering device upon the return or inward movement of the rod, and the series of springs for returning the rods when they have been pulled out, substantially as and for the purpose described.

21. In a register and indicator, a series of reciprocating bars, a series of indicators, and means whereby each bar operates its respective indicator as it is drawn out, in combination with the series of ratchet-toothed wheels journaled above the rods carrying graduated register-bands, springs for retracting the bars, and pawls adapted to engage the teeth on the band-wheels during the return movement of the bars, substantially as shown and described.

22. In a register and indicator, a sliding bar for actuating an indicating device, in combination with a band-wheel provided with ratchet-teeth at one side, a band passing around the wheel and moved thereby, graduated and marked with numbers, each successive one of which represents a sum greater than the preceding by an amount equal to that shown by the indicating device operated by the bar, and a pawl on the bar adapted to engage a tooth on the wheel at each return movement of the bar, substantially as and for the purpose described.

23. In combination with a series of indicating devices, the series of sliding rods, suitable connecting means between the rods and indicating devices, the pawls on the rods, the series of band-wheels journaled over these rods and provided on their peripheral surfaces with pins, and at their sides with ratchet-teeth projecting beyond their peripheries and adapted to be engaged by the pawls on the bars, a fixed bar, and the graduated numbered bands or belts passing around the wheels and around said cylindrical fixed bar, and provided with holes for engagement with the pins on the wheels, substantially as and for the purpose described.

24. In a combined cash register, indicator, and money-changer, in combination with the mechanism for making change and the registering and indicating mechanism, means for automatically locking the money-changing mechanism from operation until the register and indicator mechanisms are operated, substantially as and for the purpose described.

25. In combination with the cash register and indicator and the money-changer, means, substantially as described, for automatically locking the money-changing mechanism after each operation thereof, and means, substantially as described, actuated by the register and indicator mechanism to unlock the money-changing mechanism, substantially as and for the purpose described.

26. In a combined cash register and indicator and money-changer, in combination with the registering and indicating and money-changing mechanism, means, substantially as described, for automatically locking the money-changer from operation until the registering and indicating mechanism has been operated, substantially as and for the purpose described.

27. In a combined cash register and indicator and money-changer, the combination with the money-changing mechanism, and the register and indicator mechanism, of means, substantially as described, for automatically locking the money-changing mechanism, and means, substantially as described, actuated by the register and indicator mechanism to unlock the money-changer, substantially as and for the purpose described.

In testimony that I claim the foregoing I have hereunto set my hand this 6th day of September, A. D. 1884.

CABEL B. HOPKINS.

Witnesses:
   HENRY C. HAZARD,
   JAS. E. HUTCHINSON.